United States Patent [19]
Agrawal et al.

[11] Patent Number: 5,970,742
[45] Date of Patent: Oct. 26, 1999

[54] DISTILLATION SCHEMES FOR MULTICOMPONENT SEPARATIONS

[75] Inventors: Rakesh Agrawal, Emmaus; Zbigniew Fidkowski, Macungie, both of Pa.

[73] Assignee: Air Products and Chemicals, Inc., Allentown, Pa.

[21] Appl. No.: 09/057,211

[22] Filed: Apr. 8, 1998

[51] Int. Cl.$^6$ .................................................. F25J 3/00
[52] U.S. Cl. ............................... 62/630; 62/643; 62/920; 62/924; 62/927
[58] Field of Search .............................. 62/630, 643, 920, 62/924, 927, 935

[56] References Cited

U.S. PATENT DOCUMENTS

| | | | |
|---|---|---|---|
| 2,743,590 | 5/1956 | Grunberg | 62/630 |
| 3,315,476 | 4/1967 | Kortlandt et al. | 62/920 X |
| 3,983,711 | 10/1976 | Solomon | 62/630 |
| 4,022,030 | 5/1977 | Brugerolle | 62/630 |
| 4,115,086 | 9/1978 | Jordan et al. | 62/622 |
| 4,277,268 | 7/1981 | Spangler Jr. | 62/630 |
| 4,311,495 | 1/1982 | Styring, Jr. | 62/630 X |
| 4,559,070 | 12/1985 | Sweet | 62/625 |
| 4,710,214 | 12/1987 | Sharma et al. | 62/621 |
| 4,805,413 | 2/1989 | Mitchell et al. | 62/630 |
| 5,311,744 | 5/1994 | Sweeney et al. | 62/646 |
| 5,425,241 | 6/1995 | Agrawal et al. | 62/643 |
| 5,577,394 | 11/1996 | Rathbone | 62/653 |
| 5,613,374 | 3/1997 | Rohde et al. | 62/643 |
| 5,680,775 | 10/1997 | Manley | 62/630 |
| 5,704,228 | 1/1998 | Tranier | 62/643 |
| 5,778,699 | 7/1998 | Darredeau | 62/653 |
| 5,784,899 | 7/1998 | Nojima et al. | 62/648 |

FOREIGN PATENT DOCUMENTS

| | | | |
|---|---|---|---|
| 1-247980 | 10/1989 | Japan | 62/920 |

OTHER PUBLICATIONS

Fidkowski, Z. T., "Minimum Energy Requirements of Thermally Coupled Distillation Systems", *AIChE Journal*, pp. 673–653, vol. 33, 1967.

Fidkowski, Z.T., "Energy Requirements of Nonconventional Distillation Systems", *AIChE Journal*, pp. 1275–1278, vol. 36, No. 8.

Rudd, H., "Thermal Coupling for Energy Efficiency", *Supplement to the Chemical Engineer*, pp. S14–S15, Aug. 27, 1992.

Triantafyllou, C., "The Design and Optimization of Fully Thermally Coupled Distillation Columns", *Trans IChemE*, pp. 118–132, vol. 70(A), 1992.

Agrawal, R., "Synthesis of Distillation Column Configurations for a Multicomponent Separation", *Ind. Eng. Chem. Res.*, vol. 35, pp. 1059–1071, 1996.

*Primary Examiner*—Christopher B. Kilner
*Attorney, Agent, or Firm*—Willard Jones, II

[57] ABSTRACT

The present invention teaches an efficient and easier to operate distillation embodiment to separate mixtures containing three or more components into streams enriched in one of the components. In this invention, from one end of an earlier distillation column, a liquid or a vapor stream containing two or more components is sent to a subsequent column, then a return vapor or a liquid stream is implemented between the same locations of the two columns. This establishes a two-way communication between one end of the earlier distillation column and the subsequent distillation column. From the other end of the earlier distillation column, a vapor or a liquid stream is eventually fed to another location of the subsequent distillation column; no return stream is implemented between the same locations of the two columns. This establishes the one-way communication between the other end of the earlier distillation column and the subsequent distillation column. The superior performance of the invention resides in the fact that the earlier distillation column has a two-way communication from one end and a one-way communication from the other end with the subsequent distillation column.

13 Claims, 12 Drawing Sheets

DISTILLATION SCHEMES FOR MULTICOMPONENT SEPARATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention suggests efficient distillation schemes to separate multicomponent mixtures containing three or more components into product streams each enriched in one of the components. Generally, the objective of a process engineer designing a distillation scheme is to make it more efficient by reducing the heat requirement of the distillation columns within the distillation scheme. The distillation schemes known in the literature that require lower heat duty are quite complex and difficult to operate. As a result, many of these schemes lack operating flexibility and are rarely used in industry. Therefore, there is a need for distillation schemes that are not complex while having low heat requirements. The present invention is an answer to this long desired need for improving the operating flexibility of multicomponent distillation while maintaining lower heat duties.

Consider the separation of a ternary mixture having components A, B and C (mixture ABC) into three product streams each enriched in one of the components. A is the most volatile component and C is the least volatile component. To separate a ternary mixture ABC into almost pure components it is required that a distillation scheme use two distillation columns. Such distillation schemes are well known in the art. There are such five well known schemes: direct sequence, indirect sequence, side rectifier, side stripper and thermally coupled columns. Each of the schemes will now be described in detail:

FIG. 1 shows a direct sequence scheme. A feed mixture containing components A, B and C (stream 10) is fed to first distillation column 100 having a condenser 110 and a reboiler 120 where it is distilled to A-enriched product (stream 70) from the top. The liquid from the bottom of this column (stream 20) is primarily a binary mixture composed of components B and C. This BC liquid stream is split into two streams. A first portion (stream 22) is fed to second distillation column 200. The second portion (stream 24) is boiled and fed as stream 26 to the bottom of first distillation column 100. B-enriched product (stream 80) and C-enriched product (stream 90) are produced from second distillation column 200 having a condenser 210 and a reboiler 220. A portion of the C-enriched bottoms liquid is boiled (stream 92) and returned to the column to provide boil-up. It is noticed that the only mass transfer between the two columns is the transfer of stream 22 from first distillation column 100 to second distillation column 200. There is no return stream from second distillation column 200 to first distillation column 100. This is an example of only a one-way communication between the two columns.

FIG. 2 shows an indirect sequence scheme. Distillation of the feed mixture (stream 10) in first distillation column 100 having a condenser 111 and a reboiler 121 produces C-enriched product (stream 90) from the bottom and a primarily binary vapor mixture AB (stream 30) from the top. A portion of this saturated vapor stream is fed to second distillation column 200 (stream 32). Another portion (stream 34) is condensed and sent as reflux (stream 36) to first distillation column 100. A-enriched product and B-enriched product (streams 70 and 80 respectively) are produced from second distillation column 200 having a condenser 211 and a reboiler 221. Once again there is only one one-way communication through stream 32 between the first and second distillation columns.

FIG. 3 shows a side rectifier scheme wherein the feed mixture ABC (stream 10) is distilled in first distillation column 100 having a condenser 110 and a reboiler 121 to produce A-enriched product (stream 70) from the top and C-enriched product (stream 90) from the bottom. A portion of the C-enriched bottoms liquid is boiled (stream 92) and returned to the column to provide boil-up. The component of intermediate volatility, B, is collected (stream 80) from the top of second distillation column 200 (also known as a side rectifier) having a condenser 210. It is important to notice that second distillation column 200 does not have a reboiler at the bottom and instead it is fed by a vapor (stream 50) which is withdrawn from a location below the feed of first distillation column 100. This vapor stream is primarily a binary mixture consisting of components B and C. The liquid (stream 52) from the bottom of second distillation column 200 is sent to first distillation column 100 at the same location as where the vapor (stream 50) was removed from first distillation column 100. This leads to a two-way communication between the two distillation columns. In a two-way communication mode, when a vapor stream is sent from one column to another column, then a return liquid stream is implemented between the same locations of the two columns. As compared to the schemes in FIGS. 1 and 2, the number of reboilers is reduced by one, and the total number of reboilers and condensers used are three vs. four.

FIG. 4 shows a side stripper scheme which is similar to FIG. 3 (corresponding streams and equipment use the same identification) except that the feed to second distillation column 200 (now known as side stripper) is a liquid (stream 60), product B (stream 80) is collected at the bottom of second distillation column 200 instead of the top and second distillation column 200 has a reboiler 221 but no condenser. The liquid stream is withdrawn from first distillation column 100 from a location which is above the feed location to first distillation column 100 and is primarily a binary mixture composed of components A and B and is fed to the top of second distillation column 200. The vapor (62) from the top of second distillation column 200 is returned to first distillation column 100 resulting in a two-way communication between the two columns. In this two-way communication mode, a liquid stream is sent from first. distillation column 100 to another column then a return vapor stream is implemented between the same locations of the two columns. It is important to notice that as compared to the scheme in FIG. 2, one less condenser is used in FIG. 4.

FIG. 5 shows a scheme which uses two two-way communications between the first and second columns, thereby using only one reboiler 222 and one condenser 212 in second distillation column 200. The two-way communication at the bottom of first distillation column 100 is the same as the one shown in FIG. 3 and at the top is the same as the one shown in FIG. 4. B-enriched product (stream 80) is collected from an intermediate location of second distillation column 200. It is important to notice that due to two two-way communications, the total number of reboilers and condensers is reduced by two.

It is known that the schemes with two-way communication (shown in FIGS. 3–5) require less heat input than the ones without two-way communication (FIGS. 1 and 2) ("Minimum Energy Requirements of Thermally Coupled Distillation Systems", Z. T. Fidkowski and L. Królikowski, *AIChE Journal*, pages 643–653, volume 33, 1987). The heat requirement in reboiler 121 in FIG. 3 is less than the total heat requirement in both reboilers of FIG. 1. Similarly, total heat input in the reboilers for the side stripper configuration in FIG. 4 is less than the total heat input in the reboilers of indirect sequence in FIG. 2. However, several studies have proven that for the separation of ternary feed mixtures into pure product streams, the configuration with two two-way communication in FIG. 5 requires the least heat input in its reboiler. It has been said that, on average, the configuration with two two-way communications requires 30 to 50% less heat than the corresponding conventional arrangements of FIGS. 1 and 2; generally it also requires much less heat than the configuration with only one two-way communication shown in FIGS. 3 and 4. It is taught in the prior art that two two-way communications are needed to achieve the lowest heat demand for ternary distillation.

While the heat demand for the scheme in FIG. 5 with two two-way communications is lowest, it has rarely been used. The lack of use has often been attributed to fear of control problems ("Thermal Coupling for Energy Efficiency", H. Rudd, *Supplement to the Chemical Engineer*, pages S14–S15, Aug. 27, 1992; "The Design and Optimization of Fully Thermally Coupled Distillation Columns", C. Triantafyllou and R. Smith, *Trans. IChemE*, pages 118–132, Volume 70(A), 1992). One of the often cited concern is the flexibility to control the flows over a wide range both at the top and bottom ends of first distillation column 100. For the vapor AB in stream 32 to flow from first distillation column 100 to second distillation column 200 it is required that the pressure at the top of the first column be greater than the pressure at the feed point of stream 32 in second distillation column 200. At the same time, for the vapor BC in stream 27 to flow from second distillation column 200 to first distillation column 100 it is necessary that the pressure at the bottom of first distillation column 100 be lower than the pressure at the originating point of stream 27 in the second column. This requires careful adjustment of pressure in both the columns. Furthermore, both the liquid transfer streams 37 and 22 at the top and bottom of first distillation column 100 flow in a direction opposite to the vapor flow at each end. This requires that either a pump be used on each of the liquid streams or relative height of the two columns be adjusted to allow each of the liquid stream to be transferred through gravity. All these factors impose constraint on the operating flexibility of the scheme with two two-way communication. Clearly, there is a need for alternative solutions with higher operating flexibility while maintaining lower heat demand for distillation.

The same challenge exists when mixtures containing more than three components are distilled to produce product streams each enriched in one of the components. The reason being that the distillation schemes with low heat demand used to distill mixtures with more than three components are made up of the ternary subscheme shown in FIG. 5. Therefore deficiencies of the ternary subscheme are also carried to the distillation of mixtures containing a greater number of components. Some known examples of four and five component distillation schemes can be found in a paper by Agrawal ("Synthesis of Distillation Column Configurations for a Multicomponent Separation", *Ind. Eng. Chem. Res.*, volume 35, pages 1059–1071, 1996).

BRIEF SUMMARY OF THE INVENTION

The present invention relates to a process for the separation of a feed stream containing three or more constituent components into product streams which are enriched in one of the constituent components by distillation in a distillation column system containing at least two distillation columns. The process comprises: (a) feeding the feed stream containing three or more constituent components to a first distillation column; (b) establishing a two-way flow communication between the first end of the first distillation column, wherein the first end is either the top end or the bottom end of the first distillation column, and a first location of a second distillation column by feeding at least a portion of the vapor or liquid stream exiting from the first end of the first distillation column to the first location of the second distillation column and in return withdrawing a stream of the opposite phase from the first location of the second distillation column and feeding it to the first end of the first distillation column, wherein liquid and vapor phases are considered as opposite phases, and (c) establishing a one-way communication between the second end of the first distillation column that is other than the first end used in step (b) and a second location of the second distillation column by feeding at least a portion of the stream exiting from the second end of the first distillation column to the second location of the second distillation column and wherein there is no return stream from the second location of the second distillation column to the second end of the first distillation column.

In one embodiment of the present invention, the first end of the first distillation column in step (b) can be the top end of the first distillation column wherein the vapor stream from the top of this distillation column is sent to the first location of the second distillation column and a liquid stream from the first location of the second distillation column is fed to the top end of the first distillation column. Further, in step (c), the second end of the first distillation column can be the bottom end of the first distillation column wherein a portion of the liquid from the bottom end of this column is fed to the second location of the second distillation column. Still further, a portion of the liquid from the bottom end of the first distillation column can be vaporized and returned back as vapor to the bottom end of this distillation column, and a portion of the vaporized stream can be fed to a suitable location of the second distillation column. Optionally, in step (c), a portion of the liquid from the bottom end of the first distillation column can be at least partially vaporized and fed to the second location of the second distillation column. In step (b), a portion of the vapor stream from the top of the first distillation column can be at least partially condensed and then fed to a suitable location of the second distillation column.

In another embodiment of the present invention, the first end of the first distillation column in step (b) can be the bottom end of the first distillation column wherein the liquid stream from the bottom of this distillation column is sent to the first location of the second distillation column and a vapor stream from the first location of the second distillation column is fed to the bottom end of the first distillation column. Further, in step (c), the second end of the first distillation column can be the top end of the first distillation column wherein a portion of the vapor from the top of this column is fed to the second location of the second distillation column. Still further, a portion of the vapor from the top of the first distillation column can be condensed and returned back as liquid to the top end of this distillation column and, optionally, a portion of the condensed stream can be fed to a suitable location of the second distillation column. Optionally, in step (c), a portion of the vapor from the top end of the first distillation column can be at least partially condensed and fed to the second location of the second distillation column. A portion of the liquid stream from the bottom of the first distillation column can be at least partially vaporized and fed to a suitable location of the second distillation column.

DETAILED DESCRIPTION OF THE INVENTION

The present invention relates to a process for the separation of a feed stream containing three or more constituent components into product streams which are enriched in one of the constituent components by distillation in a distillation column system containing at least two distillation columns comprising:

a) feeding the feed stream containing three or more constituent components to a first distillation column;

b) establishing a two-way flow communication between the first end of the first distillation column, wherein the first end is either the top end or the bottom end of the first distillation column, and a first location of a second distillation column by feeding at least a portion of the vapor or liquid stream exiting from the first end of the first distillation column to the first location of the second distillation column and in return withdrawing a stream of the opposite phase from the first location of the second distillation column and feeding it to the first end of the first distillation column, wherein liquid and vapor phases are considered as opposite phases, and c) establishing a one-way communication between the second end of the first distillation column that is other than the first end used in step (b) and a second location of the second distillation column by feeding at least a portion of the stream exiting from the second end of the first distillation column to the second location of the second distillation column and wherein there is no return stream from the second location of the second distillation column to the second end of the first distillation column.

To provide a more detailed description, the present invention will be described in reference to embodiments shown in FIGS. 6–12.

Figure 6:
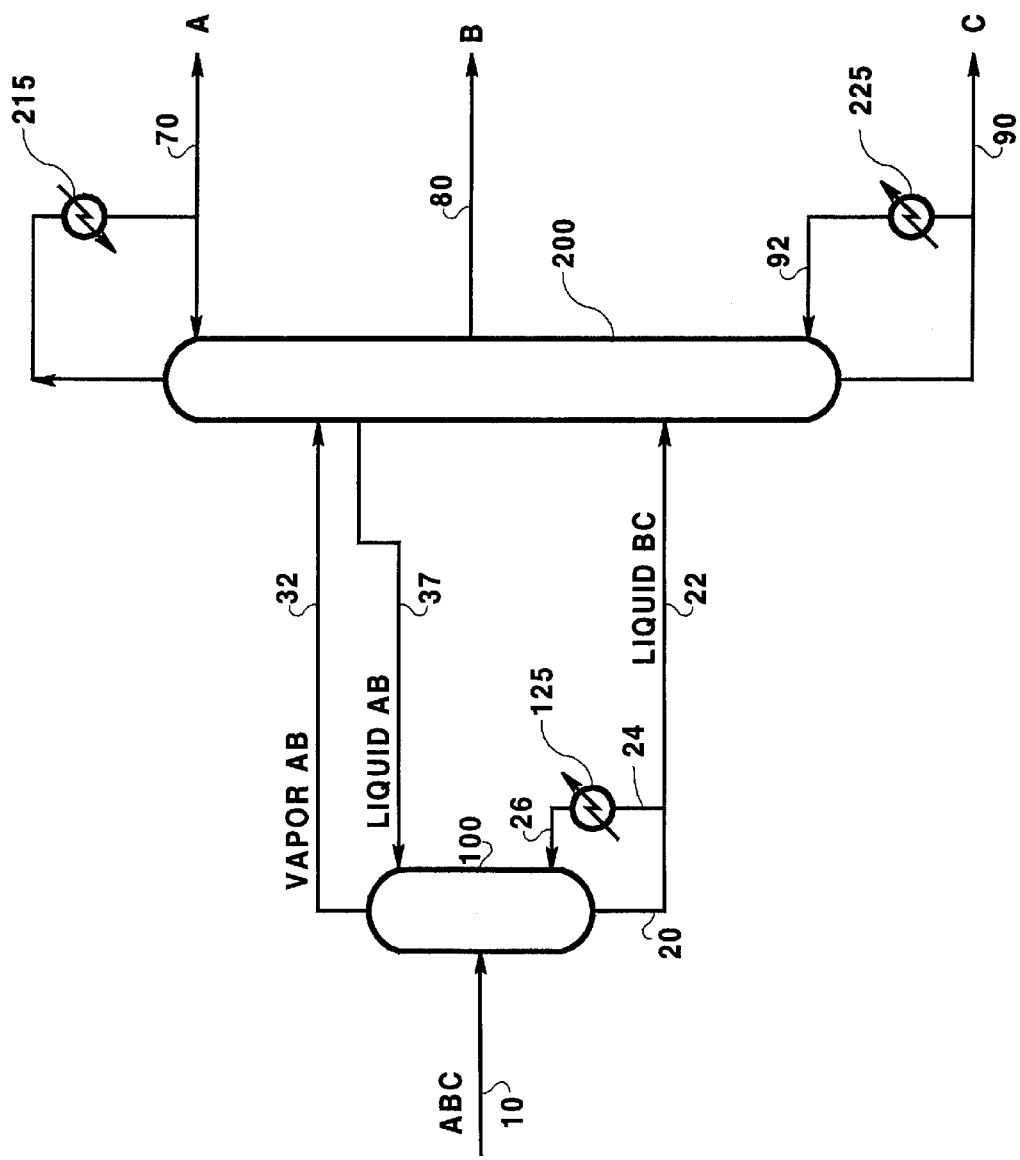
FIGS. 6 through 12 are schematic diagrams illustrating several embodiments of the present invention.

FIG. 6 shows the basic feature of the present invention. A ternary feed ABC is fed to the first distillation column. Out of these three components, A is the most volatile and C is the least volatile. Vapor stream 32 from the top and first end of first distillation column 100 is fed to a first location in the upper portion of second column 200. Liquid stream 37 is withdrawn from this first location of second column 200 and returned to the top of first column 100. It is important to notice that phase of stream 37 is opposite to phase of stream 32. From the bottom end of first distillation column 100, a portion of liquid in line 22 is sent to a second location of second distillation column 200. This second location is below the first location and is in the lower portion of second distillation column 200. Component B is withdrawn from second distillation column 200 at a location intermediate of the first and second locations. In FIG. 6, two-way communication exists between the top of first distillation column 100 and the upper portion of second distillation column 200. The one-way communication is between the bottom of first distillation column 100 and the lower section of second distillation column 200. Component A is produced and removed from the top of second distillation column 200 and component C from the bottom of second distillation column 200.

Figure 7:
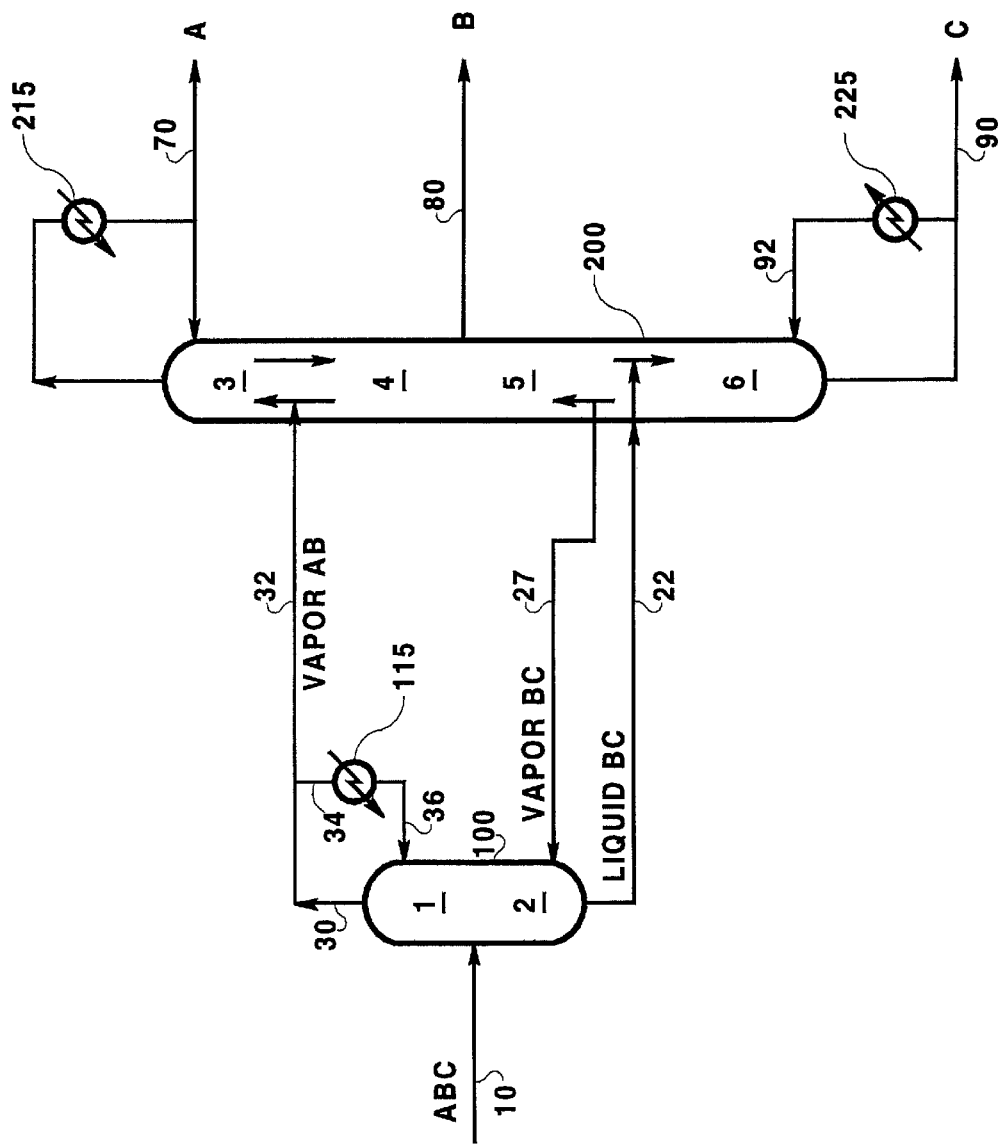

FIG. 7 shows a variation of the present invention where the bottom end of first distillation column 100 has a two-way communication with the bottom section of second distillation column 200 and the top end of first distillation column 100 has only one-way communication with the top section of second distillation column 200. Thus, liquid stream 22 from the bottom end, which is now the first end, of first distillation column 100 is sent to the bottom section of second distillation column 200. The first location is now located in the bottom section of second distillation column 200. Since stream 22 is liquid, a vapor stream 27 is withdrawn from the first location of second distillation column 200 and sent to the bottom of first distillation column 100. A portion of the vapor stream exiting from the top end of first distillation column 100 is sent as stream 32 to second distillation column 200. The top end of first distillation column 100 is now the second end of first distillation column 100.

Figure 8:
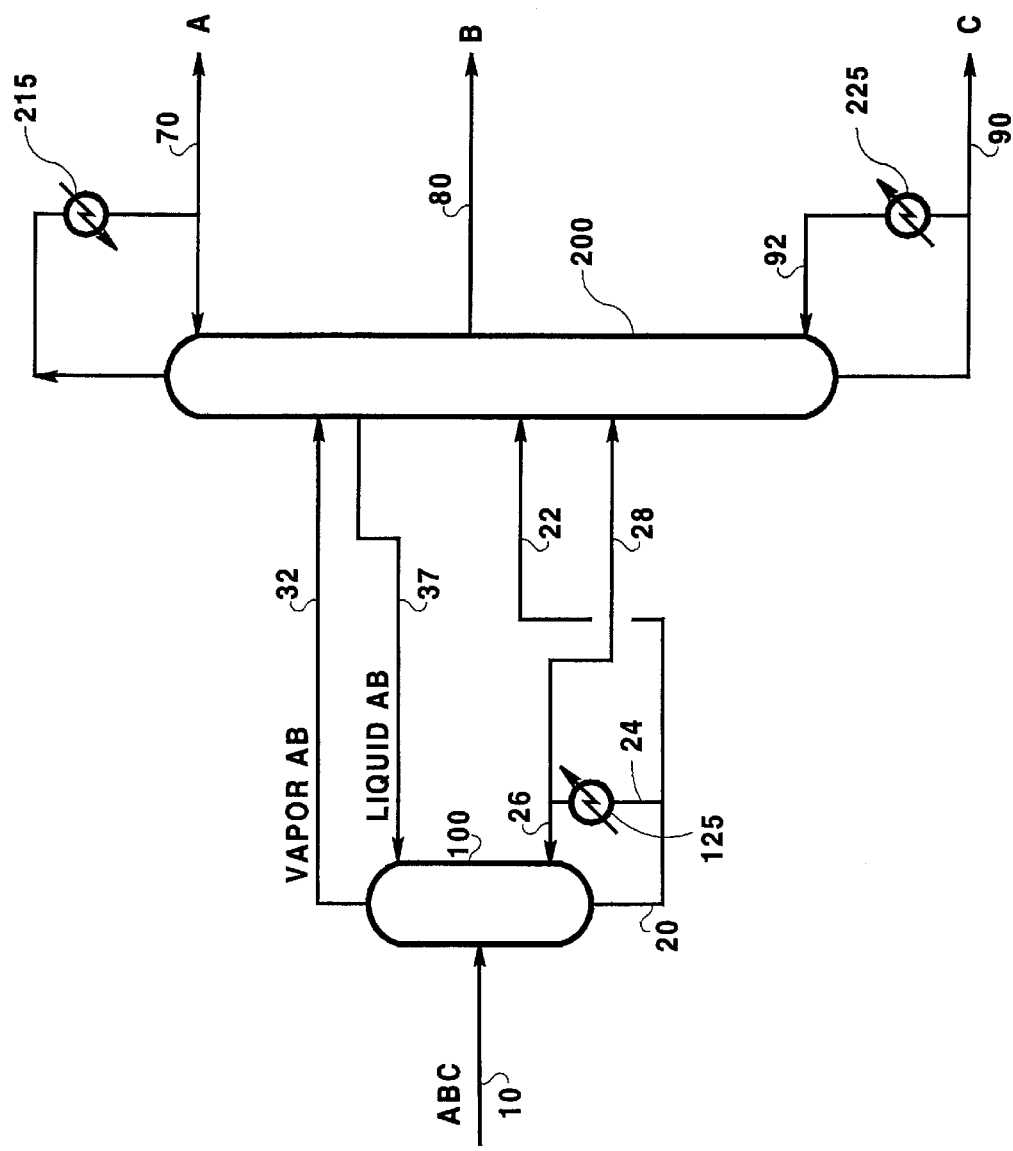

FIG. 8 demonstrates another variation of the process shown in FIG. 6 where one-way communication is established by having two (2) streams transferred from the bottom end of first distillation column 100 to the bottom section of second distillation column 200. Thus, a portion of the liquid stream in line 20 exiting from the bottom end of first distillation column 100 is sent through line 22 to second distillation column 200. Then, another portion of this liquid is sent in line 24 to reboiler 125. A portion of the vapor exiting from this reboiler 125 is returned to the bottom of first distillation column 100 through line 26, while the other portion is fed through line 28 to a location of the second column that is preferably below that of liquid stream 22. The main thing to note is that no stream is returned from the feed points of stream 22 and 28 of second distillation column 200 to the bottom end of first distillation column 100. The top end of first distillation column 100 has the same two-way communication as shown in FIG. 6.

It is also possible to have an embodiment with one-way communication derived from FIG. 8 such that there would be no flow in line 22. The only flow would be the flow through stream 28. This embodiment demonstrates the point that a portion of the liquid stream exiting from the bottom of the first distillation may be further heat exchanged prior to eventually feeding it to second distillation column 200.

Figure 9:
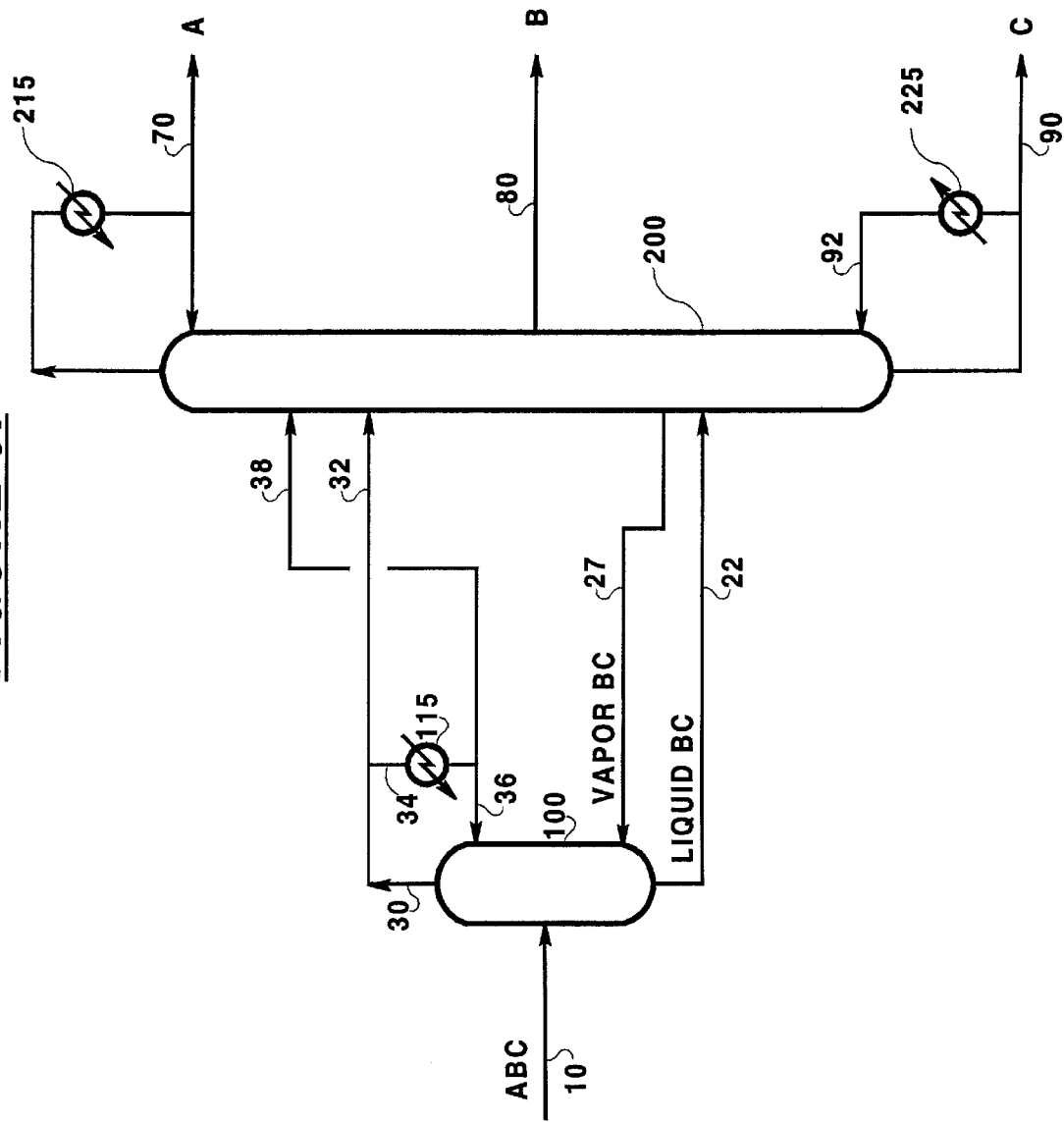

FIG. 9 shows a process embodiment derived from the process shown in FIG. 7 where the one-way communication from the top end of first distillation column 100 transfers two streams to the top section of second distillation column 200. The vapor stream 30 from the top of first distillation column 100 is divided into two streams 32 and 34. The vapor stream 32 is fed to second distillation column 200. The vapor stream 34 is sent to condenser 115 and a portion of the liquid exiting this condenser is also fed to second distillation column 200 as liquid stream 38. Preferably, liquid stream 38 will be fed a couple of stages above the vapor stream 32. It is important to notice that no stream is returned from either of the feed locations of stream 32 and 38 of second distillation column 200 to the top end of first distillation column 100. The bottom end of first distillation column 100 has the same two-way communication with second distillation column as the process embodiment in FIG. 7.

It is worth mentioning that in the process embodiment of FIG. 9, the flow rate of stream 32 could be zero and the only transfer for one-way communication from the top end of first distillation column 100 to second distillation column 200 would be through stream 38. This alternative demonstrates that for a one-way communication, a portion of the stream exiting from the second end of first distillation column 100 may not be immediately transferred to second distillation column 200 but is transferred after some heat exchange.

Figure 10:
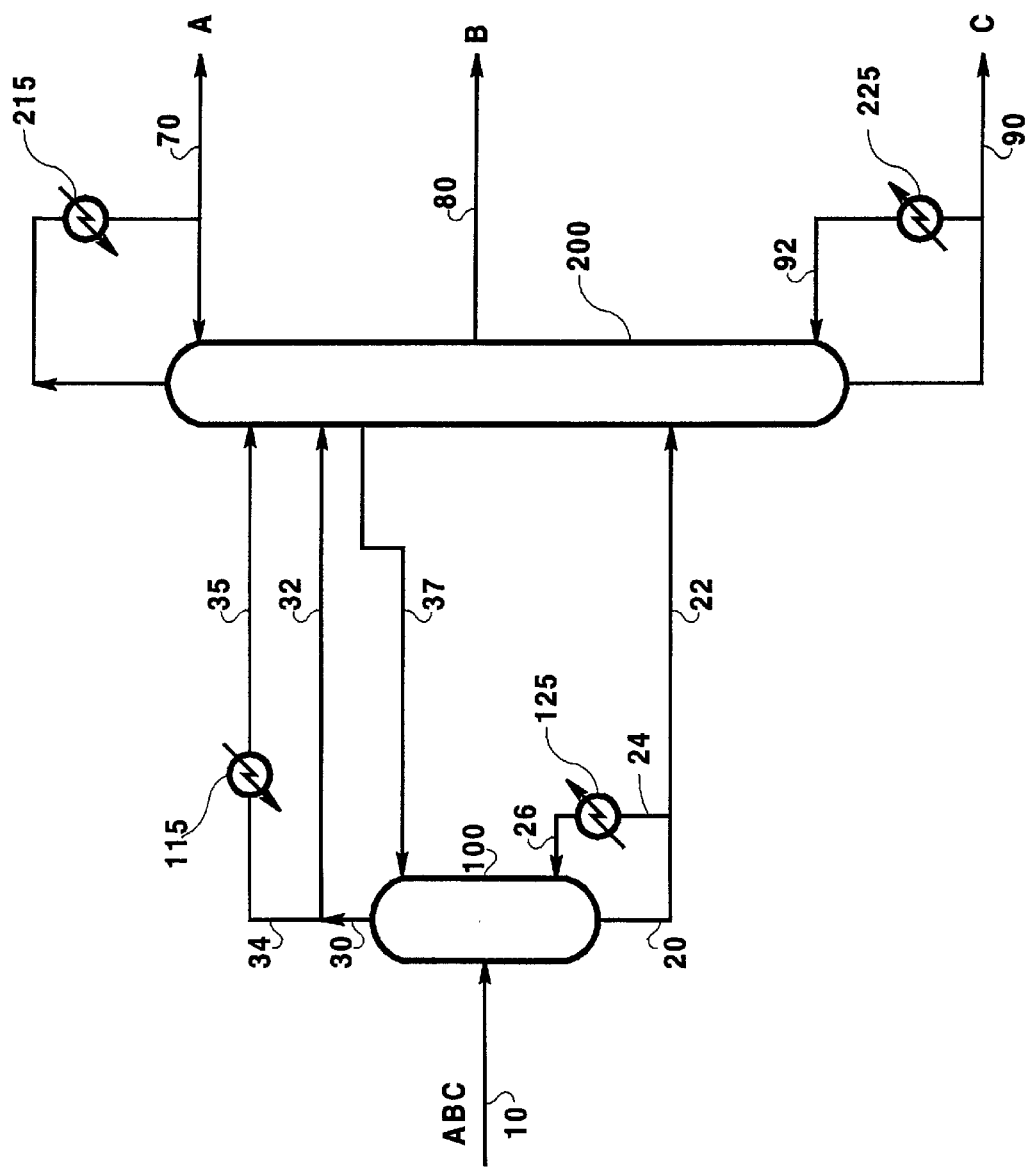

FIG. 10 shows another embodiment of the present invention where only a portion of the stream exiting from the first end of first distillation column 100 is sent to the first location of second distillation column 200 to establish two-way communication. The other portion of the stream exiting from the first end is heat exchanged and then fed to second distillation column 200 at an appropriate location. In FIG. 10, a portion of the vapor stream 30 exiting from the top of first distillation column 100 is sent as stream 34 to condenser 115 and after at least partial condensation, it is sent as stream 35 to second distillation column 200. Preferably, stream 35 will be fed at a couple of stages above the feed point of stream 32. The one-way communication at the bottom of first distillation column 100 is same as for the embodiment in FIG. 6. If the similar modification was to be done for the embodiment in FIG. 7, then a portion of liquid stream 22 will be sent to a vaporizer and after at least some vaporization it would be fed to second distillation column 200 at a location which is preferably a couple of stages below the liquid stream 22 feed location.

Another aspect of the embodiment in FIG. 10 that is different from the embodiments of FIGS. 6–9 is that the FIG. 10 embodiment uses a total of four (4) rather than a total of three (3) reboilers and condensers. This shows that when needed, it is possible to use additional reboilers and/or condensers in the process of the current invention. For example, a reboiler or a condenser could be used at a location where product B (stream 80 in FIGS. 6–10) is withdrawn from the second column. If a condenser is used at this location, then at least a portion of the vapor stream from this location is condensed and returned back to the distillation column. If a reboiler is used at this location, then at least a portion of the liquid stream from this location is vaporized and returned back to the distillation column.

As stated earlier, the same challenge exists when mixtures containing more than three components are distilled to produce product streams each enriched in one of the components. Each of these systems are made up of subsystems that may be thought of as ternary separation and therefore, it is relatively easy to apply the concepts explained for ternary distillation to mixtures containing four or more components.

Figure 11:
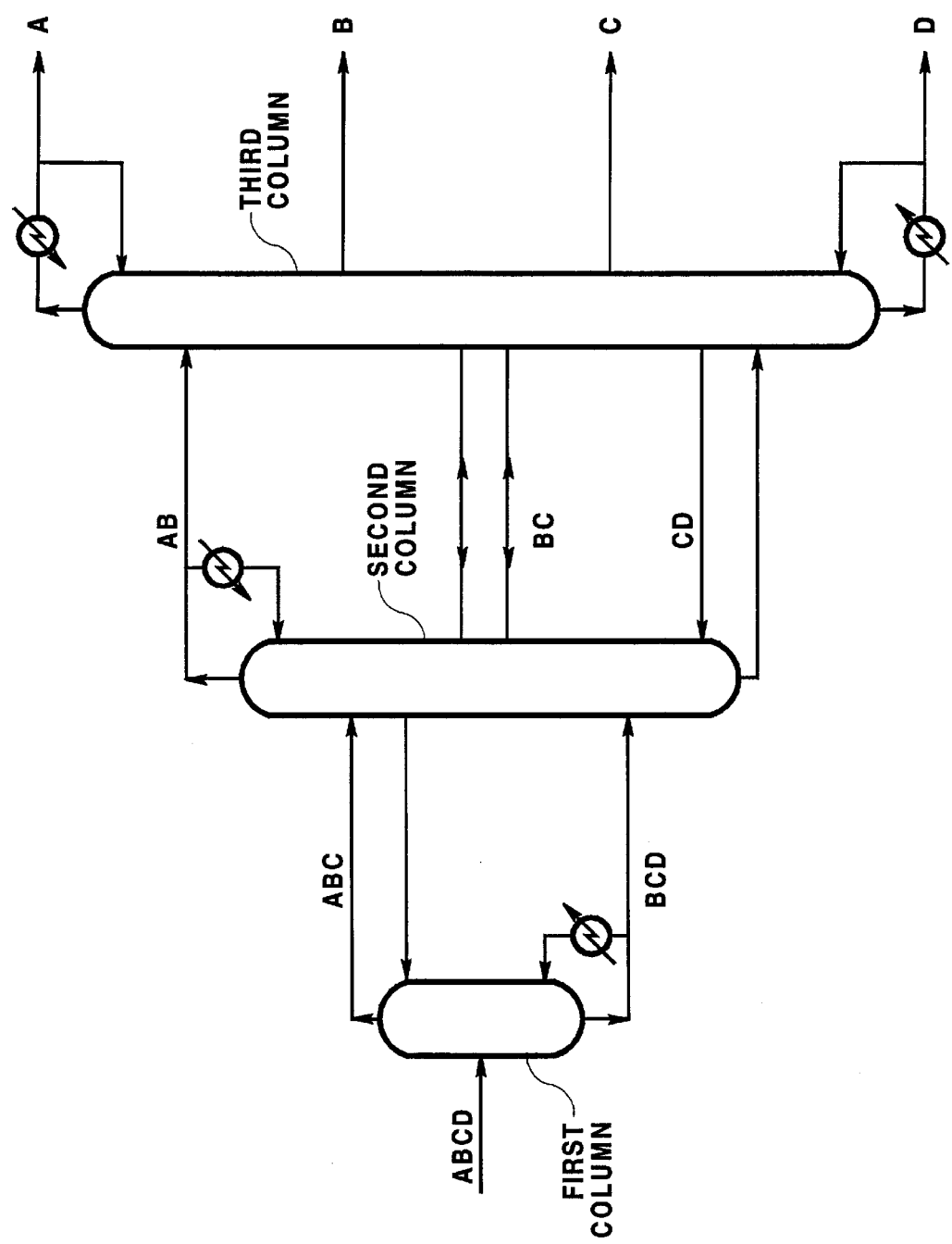

The application of the present invention for a four-component mixture ABCD is illustrated in FIG. 11. In this mixture, the relative volatility follows the alphabetical order, i.e., A is the most volatile, D is the least volatile and B is more volatile than C. The feed mixture ABCD is fed to the first distillation column. The vapor stream from the top of the first distillation column has a two-way communication with the second distillation column and the bottom has a one-way communication with the second distillation column. Both these communications are analogous to the ones shown between the first and second distillation columns of FIG. 6. The bottom liquid stream from the first distillation column is rich in the heavier components. There are three (3) more communications between the second distillation column and the third distillation column. The first of these communications is from the top of the second distillation column to the third distillation column. This transfer is mainly of components A and B. The second of these communications is from the middle of the second distillation column to the third distillation column. This transfer is mainly of components B and C. The third communication is from the bottom of second distillation column to the third distillation column. This time mainly components C and D are transferred. Any of these three communications can be a two-way communication and similarly any one can be a one-way communication. In FIG. 11, the top of the second distillation column is shown to be linked to the third distillation column through a one-way communication, while the bottom of the second distillation column has a two-way communication with the third distillation column. Product streams each enriched in one of the components are produced from the third distillation column as shown in FIG. 11.

It should be emphasized that even though the four-component separation embodiment of FIG. 11 uses the process of current invention between both the first and second distillation columns and also between the second and third distillation columns, it is not essential to do so and it could be used between only one of the two consecutive distillation columns. Thus, while communication between the first and second distillation columns could be according to the current invention as shown in FIG. 11, the transfers between the second distillation and third distillation columns could be by any desirable method. Similarly, in an alternate embodiment, the transfer between the first and second distillation column could be by any desirable method while the transfers between the second and third distillation columns would use the process of the current invention.

Figure 12:
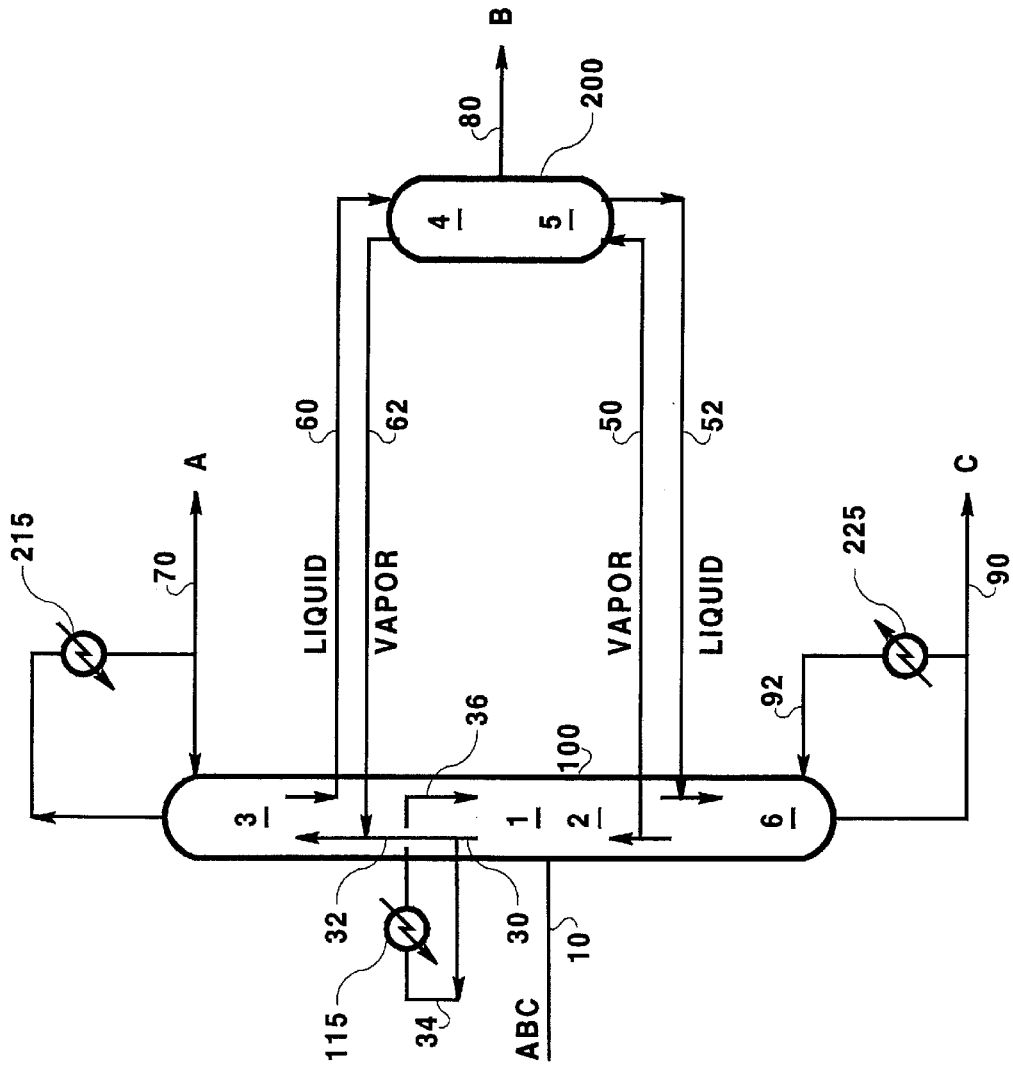

Finally, it is worth pointing out that it is possible to rearrange the distillation column sections of the processes shown in FIGS. 6–11 differently than that shown in these figures but they would still be considered the process of the present invention. This is illustrated in FIG. 12 by rearranging the distillation column sections of the process in FIG. 7. From the invention perspective, the basic features of both of the processes in FIGS. 7 and 12 are identical. The top distillation section 3 of second distillation column 200 in FIG. 7 is physically moved above the distillation section 1 of first distillation column 100 in FIG. 12. As in FIG. 7, all the liquid descending from distillation section 3 is sent to the distillation section 4 as liquid stream 60 in FIG. 12. Similarly, the only liquid introduced to the top of the distillation section 1 is in stream 36 that comes from condenser 115. In both the figures, a portion of the vapor stream 30 leaving from the top of the distillation section 1 is sent to the condenser 115 as vapor stream 34, while the other vapor portion 32 is mixed with the vapor stream from the top of distillation section 4 (stream 62 in FIG. 12) and sent to the bottom of distillation section 3. The bottom distillation section 6 of second distillation column 200 in FIG. 7 is also physically moved below distillation section 2 in FIG. 12. However, still all the liquid from the bottom of distillation section 2 is combined with all the liquid from the bottom of distillation section 5 and the combined stream is introduced to the top of distillation section 6. Similarly, the vapor stream from the top of the distillation section 6 is divided between distillation sections 2 and 5. FIG. 12 illustrates that just rearranging the distillation sections of a process of the current invention does not lead to a new process and will still be covered by the invention described here.

In all the flowsheets of FIGS. 1–12 some of the streams are designated alphabetical names. It shows the particular component in which that stream is enriched in, and does not necessarily mean absence of other components. Thus, a stream with letter A indicates a product stream enriched in component A and it could be pure product stream or a stream contaminated with significant quantities of other components. Similarly, a stream with designation AB means that the stream is enriched in components of A and B, and it either contains only components A and B or could contain other heavier components such as C.

The present invention is applicable to the separation by distillation of any suitable feed mixture containing three or more components. Some examples of feed streams which the present invention is applicable to include nitrogen/oxygen/argon mixtures, benzene/toluene/xylene mixtures, nitrogen/carbon monoxide/methane mixtures, any combination of three or more components from C1 to C5 alcohols, any combination of three or more components from C1 to C6 hydrocarbons, or $C_4$ isomers.

Figure 3:
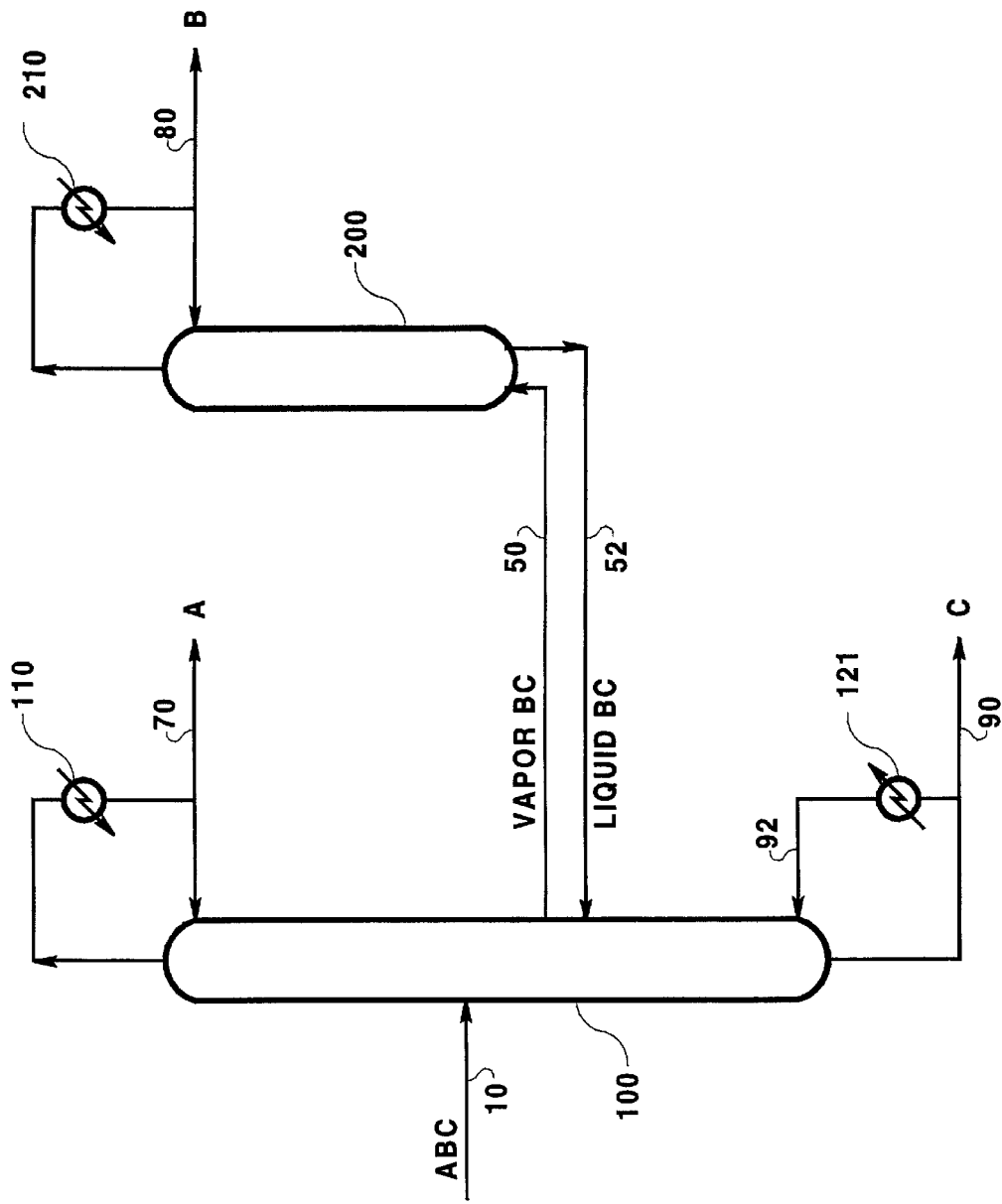
Figure 4:
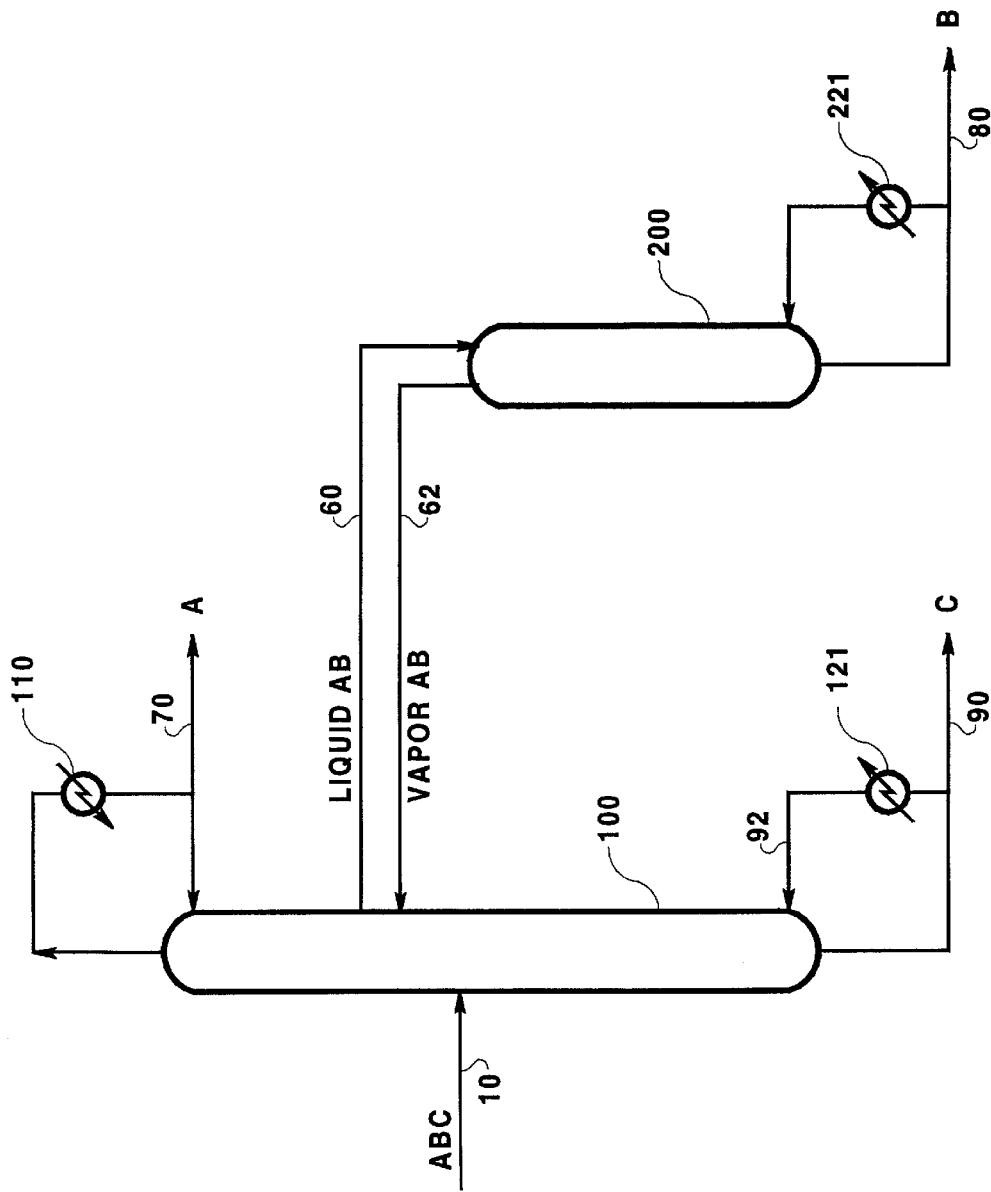
Figure 5:
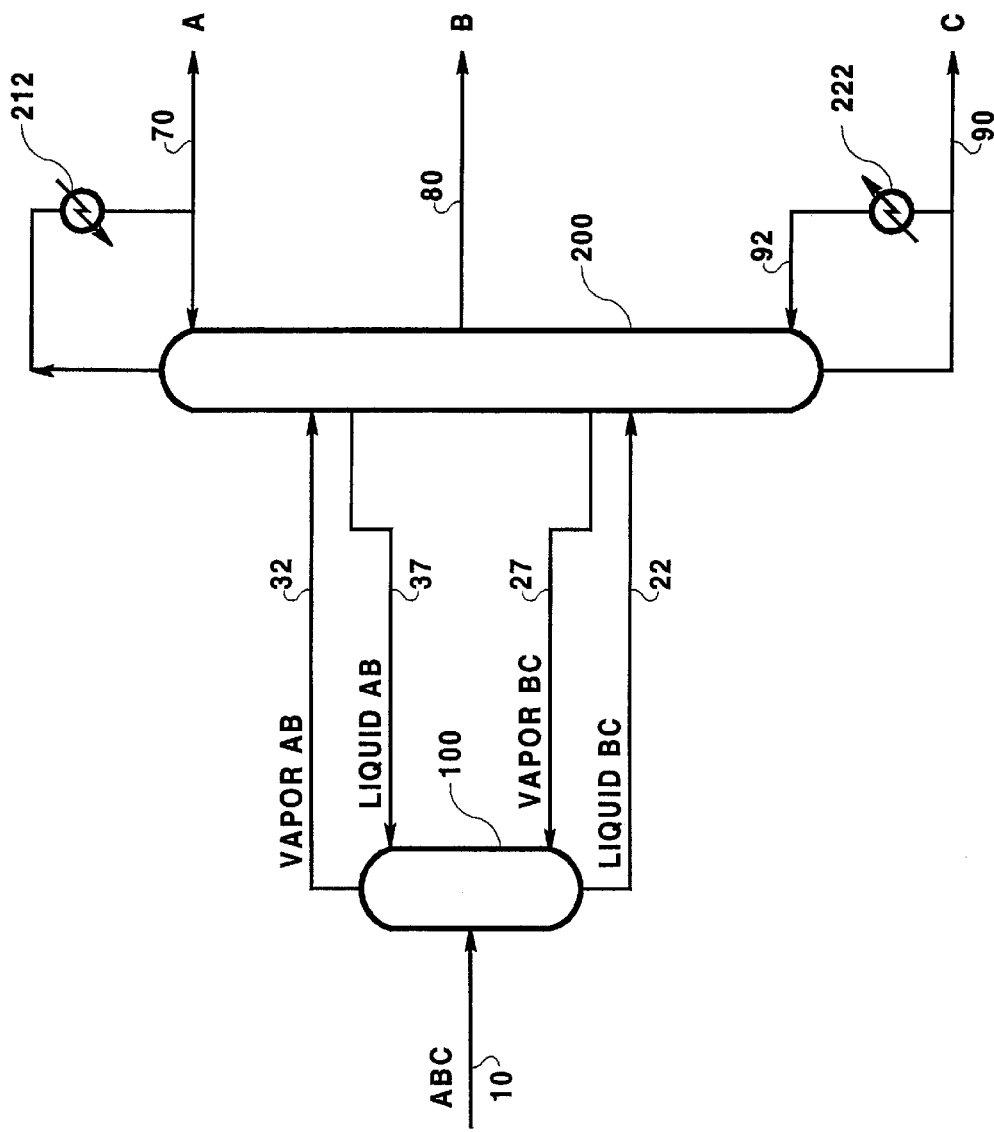

Among the prior art processes for ternary distillation shown in FIGS. 1–5, it is well known that the process in FIG. 5 requires the least total vapor flow to perform the required distillation. Since the vapor flows are created through the reboilers, the required vapor flow is a direct measure of the heat duty needed for the distillation. A lower vapor flow is attractive as it leads to lower heat duty and smaller diameter of the distillation columns. The biggest advantage of the current invention is that unlike the prior art process of FIG. 5 which uses two two-way communication between the first and second distillation columns, it uses only one two-way communication and yet requires the total vapor flow for distillation that is either nearly equal to or very similar to the vapor flow needed for the prior art process of FIG. 5. A potential advantage of having only one two-way communication between two distillation columns is the improvement in the operability of the columns. For example consider the process of FIG. 6. In order to transfer the vapor stream 32 from first distillation column 100 to second distillation column 200, the pressure at the top of first distillation column 100 would be higher than the pressure at the feed location of this vapor stream in second distillation column 200. The liquid stream 37 is then transferred either preferably under the gravitational head or through the use of a pump. The liquid stream 22 from the bottom of first distillation column 100 can now be easily transferred to second distillation column 200 through either the pressure difference between the two columns or through the gravitational head or through the use of a pump. The returning vapor stream 27 from second distillation column 200 to the bottom of first distillation column 100 in FIG. 5 imposes the constraint that the pressure at the withdrawal location of the vapor stream 27 in second distillation column 200 be greater than the pressure at the bottom of first distillation column 100. No such constraint is imposed on the process of FIG. 7 and therefore, a more flexible process is obtained.

The fact that the process of present invention requires the total vapor flow that is either equal to or similar to the vapor flow for the process of FIG. 5 will now be demonstrated through the following two examples:

EXAMPLE 1

Separation of a three component mixture containing 33% A, 33% B and 34% C into pure components was considered. The feed mixture was saturated liquid and all the products were produced as saturated liquids. The relative volatility of A with respect to C was taken to be 3 and of B with respect to C was equal to 2. All three components were taken to have same latent heat. For each embodiment calculations were done to achieve separation with minimum possible vapor flow. In other words, the total boil-up need was at its minimum. This is achieved by having columns pinched at the feed in locations. This allowed a fair comparison of heat duties between different embodiments. The results are listed in Table 1. The basis of calculation in this table is feed flow of 1 mole.

TABLE 1

Example 1: Total Vapor Flow for Various Figures
Basis: Feed Composition = 33% A, 33% B and 34% C
Feed Flow = 1 mole

Figure 1:
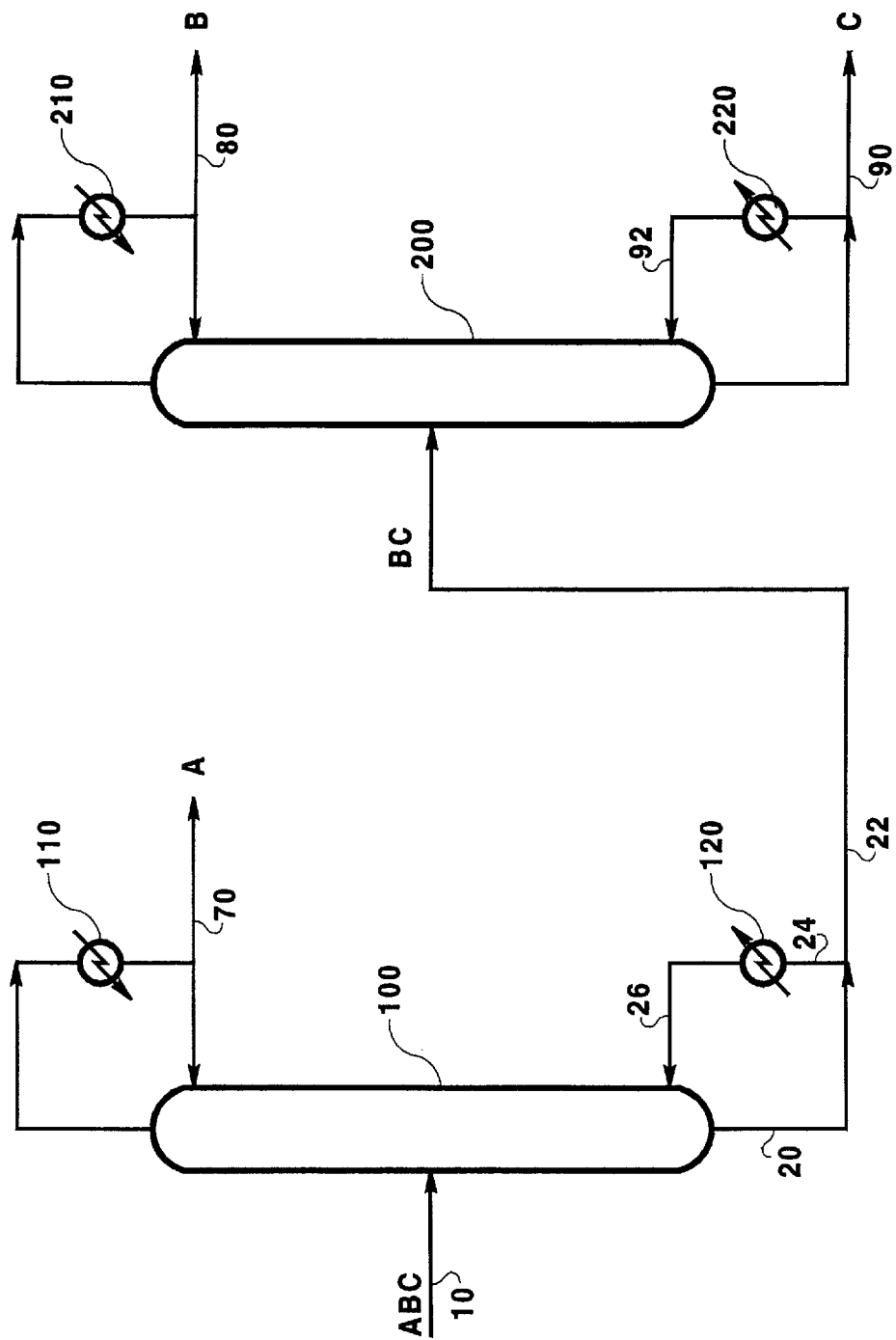
FIGS. 1 through 5 are schematic diagrams illustrating prior art processes for the separation of ternary mixtures into their constituent components.
Figure 2:
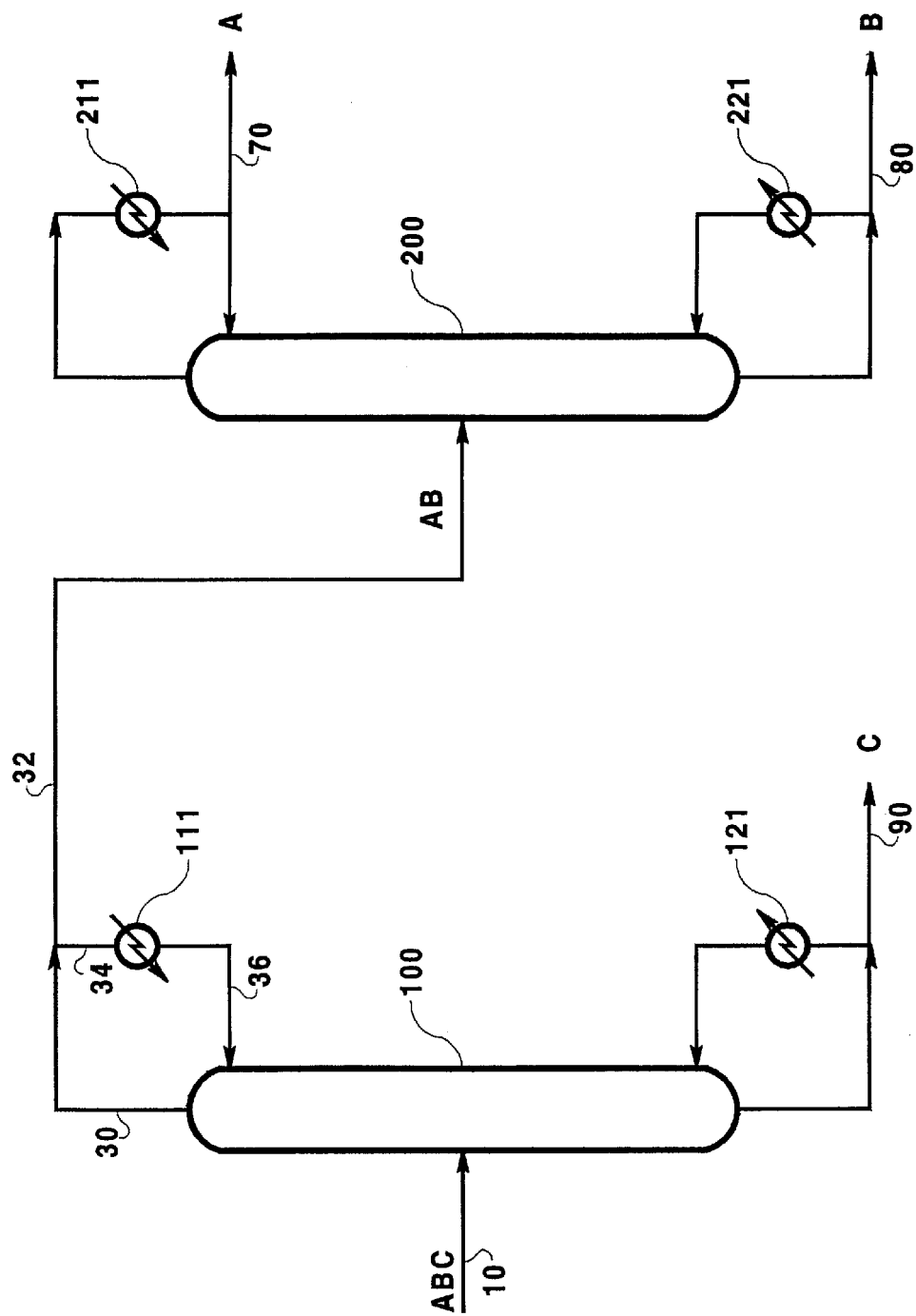

| Process | Total Vapor Flow |
|---|---|
| FIG. 1 | 2.753 |
| FIG. 2 | 2.748 |
| FIG. 3 | 2.516 |
| FIG. 4 | 2.516 |
| FIG. 5 | 1.753 |
| FIG. 6 (Current Invention) | 1.753 |
| FIG. 7 (Current Invention) | 1.985 |

For some of the processes total vapor flow is sum of the vapor generated in two reboilers; FIGS. 1, 2, 4 and 6 are such processes. In FIGS. 3, 5 and 7, the total vapor is same as the vapor generated in only one reboiler. From Table 1 it is observed that among the prior art process of FIGS. 1–5, the processes in FIGS. 1 and 2 require a fairly high total vapor flow and the process in FIG. 5 requires the least total vapor flow. It is interesting to note that the process of the present invention in FIG. 6 requires the same total vapor flow as the well known process of FIG. 5. Also, the total vapor flow of the process in FIG. 7 is much closer to the one in FIG. 5; and it is considerably lower than the processes of FIGS. 3 and 4.

EXAMPLE 2

Calculations similar to the one in Example 1 were done for a feed composition of 5% A, 90% B, and 5% C. The relative volatility of A with respect to C was 6 and of B with respect to C was equal to 3. All the three (3) components had the same latent heat. Each embodiment was solved to achieve separation with minimum possible vapor flow. The basis of calculation was feed flow of 1 mole and the results are summarized in Table 2. Once again it is found that while the other prior art processes in FIGS. 1–4 require much higher total vapor flow than the process of FIG. 5; the total vapor flow for the process in FIG. 7 is the same as that of FIG. 5. Also, the total vapor flow for the process in FIG. 6 is very close to the one in FIG. 5.

TABLE 2

Example 2: Total Vapor Flow for Various Figures
Basis: Feed Composition = 5% A, 90% B and 5% C
Feed Flow = 1 mole

| Process | Total Vapor Flow |
|---|---|
| FIG. 1 | 2.385 |
| FIG. 2 | 2.384 |
| FIG. 3 | 2.374 |
| FIG. 4 | 2.374 |
| FIG. 5 | 1.434 |
| FIG. 6 (Present invention) | 1.445 |
| FIG. 7 (Present Invention) | 1.434 |

It is clear from both the examples that the processes drawn according to the present invention require much lower heat duty to perform a distillation. The processes in FIGS. 6 and 7 use the same number of total reboilers and condensers as the processes of FIGS. 3 and 4 and yet their total vapor requirement is much lower. Furthermore, since the processes in FIGS. 6–10 use either reboiler 125 and/or condenser 115 that operate at temperatures which are intermediate of the condenser 215 temperature and the reboiler 225 temperature, the thermodynamic efficiency of these embodiments will generally be higher than the prior are process of FIG. 5. This is particularly important for high efficiencies of distillations performed at subambient temperatures.

We claims:

1. A process for the separation of a feed stream containing three or more constituent components into product streams which are enriched in one of the constituent components by distillation in a distillation column system containing at least two distillation columns comprising:

(a) feeding the feed stream containing three or more constituent components to a first distillation column;

(b) establishing a two-way flow communication between the first end of the first distillation column, wherein the first end is either the top end or the bottom end of the first distillation column, and a first location of a second distillation column by feeding at least a portion of the vapor or liquid stream exiting from the first end of the first distillation column to the first location of the second distillation column and in return withdrawing a stream of the opposite phase from the first location of the second distillation column and feeding it to the first end of the first distillation column, wherein liquid and vapor phases are considered as opposite phases, and (c) establishing a one-way communication between the second end of the first distillation column that is other than the first end used in step (b) and a second location of the second distillation column by feeding at least a portion of the stream exiting from the second end of the first distillation column to the second location of the second distillation column and wherein there is no return stream from the second location of the second distillation column to the second end of the first distillation column.

2. The process according to claim 1 wherein the first end of the first distillation column in step (b) is the top end of the first distillation column and the vapor stream from the top of this distillation column is sent to the first location of the second distillation column and a liquid stream from the first location of the second distillation column is fed to the top end of the first distillation column.

3. The process according to claim 2 wherein in step (c) the second end of the first distillation column is the bottom end of the first distillation column and a portion of the liquid from the bottom end of this column is fed to the second location of the second distillation column.

4. The process according to claim 3 wherein a portion of the liquid from the bottom end of the first distillation column is vaporized and returned back as vapor to the bottom end of this distillation column.

5. The process according to claim 4 wherein a portion of the vaporized stream is also fed to a suitable location of the second distillation column.

6. The process according to claim 2 wherein, in step (c), a portion of the liquid from the bottom end of the first distillation column is at least partially vaporized and fed to the second location of the second distillation column.

7. The process according to claim 2 which further comprises of at least partially condensing a portion of the vapor stream from the top of the first distillation column and then feeding this at least partially condensed stream to a suitable location of the second distillation column.

8. The process according to claim 1 wherein the first end of the first distillation column in step (b) is the bottom end of the first distillation column and the liquid stream from the bottom of this distillation column is sent to the first location of the second distillation column and a vapor stream from the first location of the second distillation column is fed to the bottom end of the first distillation column.

9. The process according to claim 8 wherein, in step (c), the second end of the first distillation column is the top end of the first distillation column and a portion of the vapor from the top of this column is fed to the second location of the second distillation column.

10. The process according to claim 9 wherein a portion of the vapor from the top of the first distillation column is condensed and returned back as liquid to the top end of this distillation column.

11. The process according to claim 10 wherein a portion of the condensed stream is also fed to a suitable location of the second distillation column.

12. The process according to claim 8 wherein, in step (c), a portion of the vapor from the top end of the first distillation column is at least partially condensed and fed to the second location of the second distillation column.

13. The process according to claim 8 which further comprises of at least partially vaporizing a portion of the liquid stream from the bottom of the first distillation column and then feeding this at least partially vaporized stream to a suitable location of the second distillation column.

* * * * *